United States Patent [19]

Terada et al.

[11] Patent Number: 4,894,531
[45] Date of Patent: Jan. 16, 1990

[54] PHOTODETECTOR FOR RECEIVING AN INDEX SIGNAL OF A BEAM-INDEX CATHODE-RAY TUBE

[75] Inventors: Katsumi Terada; Tetsuya Enomoto, both of Hirakata, Japan

[73] Assignee: Sanyo Electric Co., Ltd., Moriguchi, Japan

[21] Appl. No.: 106,847

[22] Filed: Oct. 13, 1987

[30] Foreign Application Priority Data

Oct. 17, 1986 [JP] Japan .................. 61-247911

[51] Int. Cl.$^4$ ............................................. H01J 29/10
[52] U.S. Cl. .................................. 250/227; 250/483.1; 313/471; 378/44
[58] Field of Search .............. 250/227, 368, 483.1; 313/422, 461, 466, 471; 378/44

[56] References Cited

U.S. PATENT DOCUMENTS

| | | |
|---|---|---|
| 3,081,414 | 3/1963 | Goodman ............. 313/471 |
| 3,691,424 | 9/1972 | Goodman ............. 313/471 |
| 4,406,974 | 9/1983 | Tanaka et al. ............. 315/3 |
| 4,654,559 | 3/1987 | Hinotani et al. ............. 313/422 |
| 4,752,716 | 6/1988 | Takeuchi ............. 313/471 |

FOREIGN PATENT DOCUMENTS 0217669  8/1987  European Pat. Off. .

OTHER PUBLICATIONS

Yamano, A Color Flat Cathode Ray Tube, "IEEE Transactions on Consumer Electronics", vol. CE-31, No. 3, Aug. 1985, pp. 163-173.

Primary Examiner—David C. Nelms
Assistant Examiner—Stephone B. Allen
Attorney, Agent, or Firm—Armstrong, Nikaido, Marmelstein, Kubovcik & Murray

[57] ABSTRACT

A photodetector including a planar light guide of a polygonal shape in which organic phosphor is dispersed in a transparent support material, and a pair of photoelectric conversion elements such that light having a wavelength range for exciting the organic phosphor is introduced into the light guide and light generated from the organic phosphor upon the excitation is guided to the photoelectric conversion elements sensitive to a wavelength of the light generated from the organic phosphor. The light guide is formed, at opposite end portions of its one side, with a pair of light emitting surfaces and the photoelectric conversion elements are, respectively, provided at the light emitting end surfaces such that a light receiving surface of each of the photoelectric conversion elements confronts each of the light emitting end surfaces.

3 Claims, 6 Drawing Sheets

PHOTODETECTOR FOR RECEIVING AN INDEX SIGNAL OF A BEAM-INDEX CATHODE-RAY TUBE

BACKGROUND OF THE INVENTION

The present invention relates to a photodetector for receiving an index signal of a beam-indexing type cathode-ray tube for use in a color television receiver, an image tube for a projector, etc.

A beam-indexing type flat color cathode-ray tube has been proposed in, for example, Japanese Patent Laid-Open Publication No. 74244/1986 as shown in FIG. 1. The known cathode-ray tube includes a flat glass tube 1, a deflection yoke 2, a light collector plate 3 and a panel 4 formed, on its inner surface, with a phosphor screen 5. The phosphor screen 5 is inclined relative to a central axis of an electron beam 6 when the electron beam 6 travels without deflection.

The phosphor screen 5 is formed as shown in FIG. 2. Namely, a layer 7 of black nonluminescent material such as carbon is formed in a shape of stripes on the inner surface of the panel 4. Index stripes 8 of a phosphor such as "P47" (name used in trade and manufactured by KASEI OPTONICS K.K. of Japan) are provided so as to interpose therebetween the layer 7. Phosphor stripes of primary colors of red (R), green (G) and black (B) are arranged at a predetermined interval on the layer 7 so as to have a definite relation with the index stripes 8. The index stripes 8 are disposed in some 9' of a plurality of gaps 9 between the phosphor stripes of the primary colors. The phosphor stripes of the primary colors have a thickness sufficient for saturating luminance of the phosphor stripes of the primary colors at a maximum luminance.

Meanwhile, the phosphor screen 5 is wholly covered with a transparent protective thin film 10 of silicon dioxide ($SiO_2$) Furthermore, a very thin transparent electrically conductive film 11 such as a thin film of ITO (indium oxide doped with tin oxide) is formed on the thin film 10 by vacuum evaporation so as to wholly cover the phosphor screen 5.

By the above described arrangement of the known cathode-ray tube, since the phosphor stripes of the primary colors R, G and B and the index stripes 8 of the phosphor are directly excited by the electron beam 6, bright images can be observed through an observation window 12 and index light of high intensity can be obtained through the panel 4. Moreover, since the layer 7 of the black nonluminescent material is disposed in the gaps 9 except for the gaps 9' in which the index stripes 8 of the phosphor are positioned, contrast ratio of images can be improved.

Index light transmitted through the panel 4 is incident upon the light collector plate 3 where a wavelength of the index light is changed to that corresponding to sensitivity of a photoelectric conversion element. Then, the index light is converted into an electric signal by the photoelectric conversion element so as to be outputted as an index signal.

As shown in FIG. 3, the light collector plate 3 has a rectangular shape. Since such light collector plate 3 is already known from, for example, Japanese Patent Laid-Open Publication No. 121664/1979, detailed description thereof is abbreviated for the sake of brevity. The light collector plate 3 is obtained by dispersing an organic phosphor such as "Macro-lex Fluorescent Yellow 10GN" (name used in trade and manufactured by Bayer AG of West Germany), Rhodamine B, etc. in plastics such as acrylic resin or transparent support material such as glass. In FIG. 3, a photodiode 13 is attached to one side of the light collector plate 3.

In FIG. 4, horizontal scanning lines (scanning electron beams) for scanning the phosphor screen 5 in the known cathode-ray tube are shown by broken lines. When an upper side portion a, a central portion b and a lower side portion c of the phosphor screen 5 are scanned by an electron beam, the light collector plate 3 is disposed at the position shown by the one-dot chain lines. Thus, signal strength, namely, intensity of light received by the photodiode 13 is compared between a case in which the photodiode 13 is disposed at the position shown in FIG. 3 and a case in which two photodiodes 13 are attached to one side of the light collector plate 3 as shown in FIG. 5. Namely, FIGS. 6a, 6b and 6c show distributions of signal strength at the upper side portion a, the central portion b and the lower side portion c of the phosphor screen 5, respectively in the case where the photodiode 13 is attached to one side of the light collector plate 3 as shown in FIG. 3. Likewise, FIGS. 7a, 7b and 7c show distributions of signal strength at the upper side portion a, the central portion b and the lower side portion c of the phosphor screen 5, respectively in the case where the two photodiodes 13 are attached to one side of the light collector plate 3 as shown in FIG. 5. As will be seen from a signal strength S1 in FIG. 6a and a signal strength S2 in FIG. 7a, strength of signals applied to positions of the light collector plate 3, which positions correspond to opposite ends of the upper side portion a of the phosphor screen 5, becomes extremely small.

This reason is described with reference to FIGS. 8 and 9, hereinbelow. Namely, assuming that characters A and B denote phosphor particles excited by index light in the light collector plate 3 of FIG. 9, paths of light generated from the phosphor particles A and B are shown by the arrows in FIG. 9, respectively. Furthermore, supposing that character M denotes an area of a light receiving surface 13a of the photodiode 13 and character K denotes luminous intensity of the phosphor particles A and B, intensity LA of light of the phosphor particle A applied, at an angle $\theta1$ of incidence, to the light receiving surface 13a of the photodiode 13 and intensity LB of light of the phosphor particle B applied, at an angle $\theta2$ of incidence, to the light receiving surface 13a of the photodiode 13 are given as follows by setting the angles $\theta1$ and $\theta2$ of incidence at 10° and 90°, respectively.

$$LA = KM \sin\theta1 = 0.17 KM \quad LB = KM \sin\theta2 = KM$$

Thus, it will be understood that since light of the phosphor particles disposed in the vicinity of the opposite ends of the upper side portion a of the phosphor screen 5 is incident upon the light receiving surface 13a of the photodiode 13 at a small angle of incidence when the photodiodes 13 are arranged as shown in FIGS. 3 and 5, strength of the index signals at the opposite ends of the upper side portion of the light collector plate 3 becomes small.

SUMMARY OF THE INVENTION

Accordingly, an essential object of the present invention is, with a view to eliminating the above described disadvantages inherent in conventional photodetectors, to provide a photodetector in which index signals of sufficient strength can be obtained at any point of a light collector plate.

In order to accomplish this object of the present invention, a photodetector embodying the present invention includes a planar light guide of a polygonal shape in which organic phosphor is dispersed in a transparent support material, and a pair of photoelectric conversion elements such that light having a wavelength range for exciting said organic phosphor is introduced into said light guide and light generated from said organic phosphor upon excitation of said organic phosphor is guided to said photoelectric conversion elements, with said photoelectric conversion elements being sensitive to a wavelength of the light generated from said organic phosphor, the improvement comprising: said light guide being formed, at opposite end portions of one side thereof, with a pair of light emitting end surfaces; said photoelectric conversion elements being, respectively, provided at said light emitting end surfaces such that a light receiving surface of each of said photoelectric conversion elements confronts each of said light emitting end surfaces.

By the above described arrangement of the photodetector of the present invention, an apparent area of the light receiving surface of each of the photoelectric conversion elements, which is obtained by observing from any point in the planar light guide, is increased.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
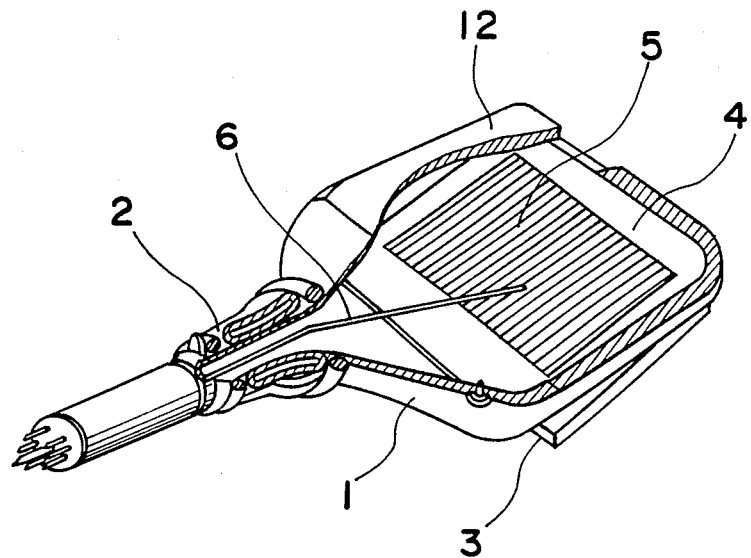
FIG. 1 is a partially cutaway perspective view of a prior art beam-indexing type flat color cathode-ray tube (already referred to)
Figure 2:
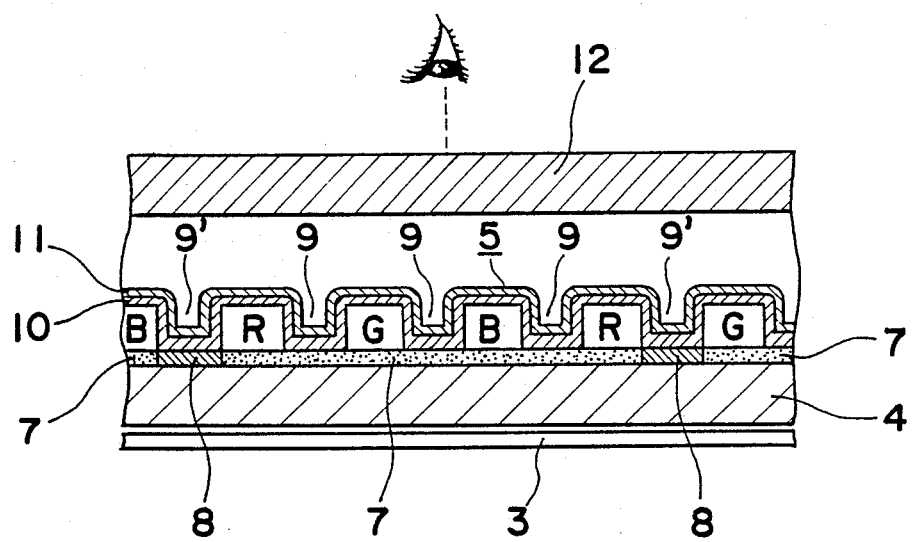
FIG. 2 is a sectional view of a main portion of the prior art cathode-ray tube of FIG. 1 (already referred to)
Figure 3:
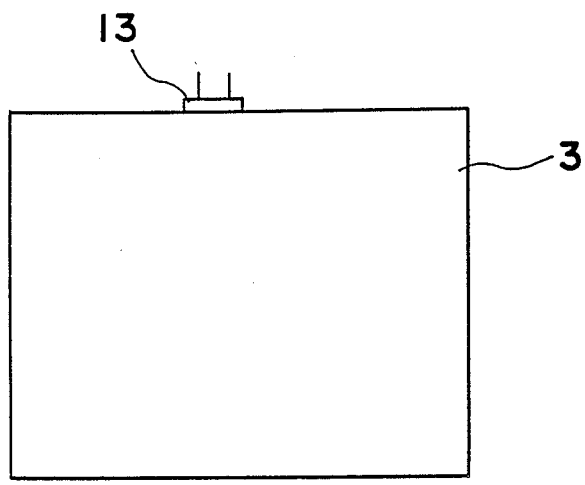
FIG. 3 is a top plan view of a prior art photodetector (already referred to)
Figure 4:
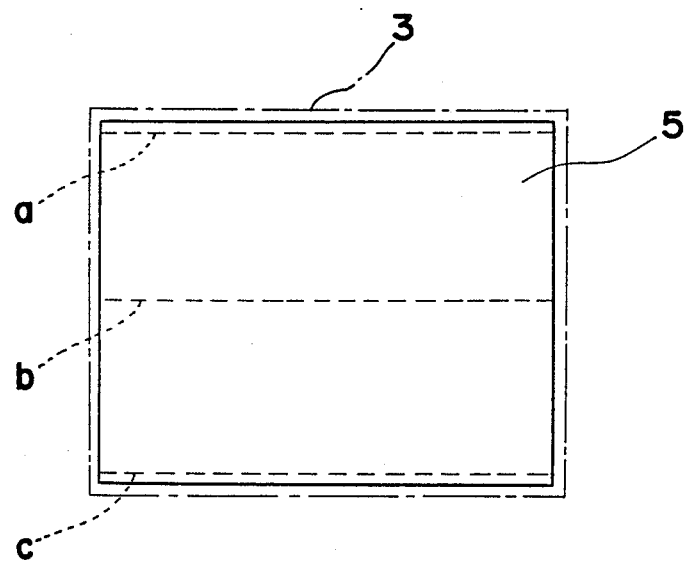
FIG. 4 is a view explanatory of scanning lines on a phosphor screen in the prior art photodetector of FIG. 3 (already referred to)
Figure 5:
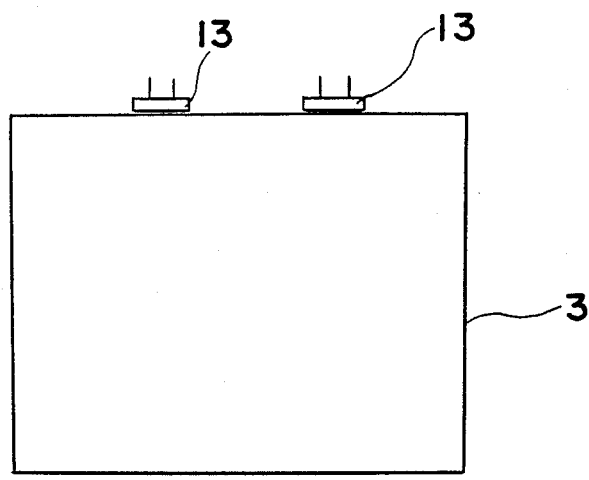
FIG. 5 is a top plan view of another prior art photodetector (already referred to)
Figure 6A:
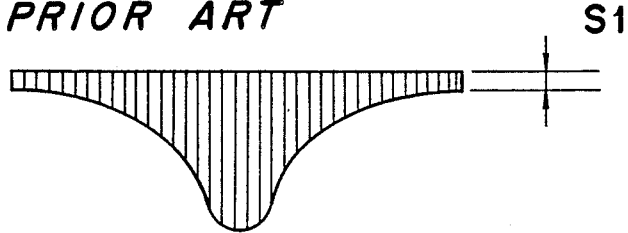
FIGS. 6a, 6b and 6c are views indicative of distributions of signal strength obtained in the prior art photodetector of FIG. 3 (already referred to)
Figure 6B:
Figure 6C:
Figure 7A:
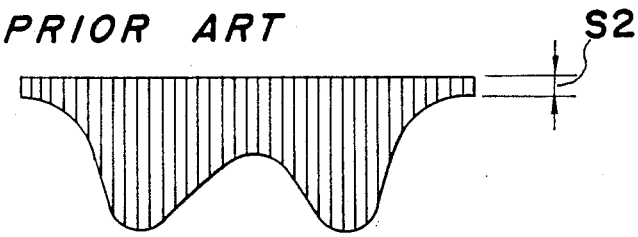
FIGS. 7a, 7b and 7c are views indicative of distributions of signal strength obtained in the prior art photodetector of FIG. 5 (already referred to)
Figure 7B:
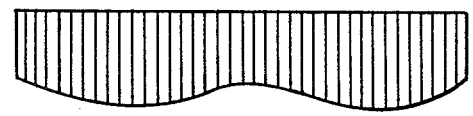
Figure 7C:
Figure 9:
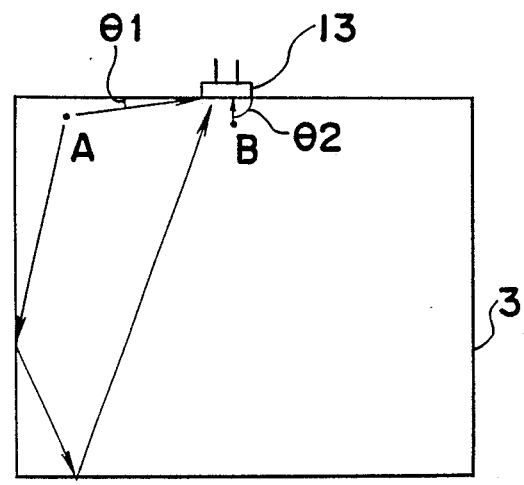
FIG. 9 is a view explanatory of drawbacks of the prior art photodetectors of FIGS. 3 and 5 (already referred to)
Figure 8:
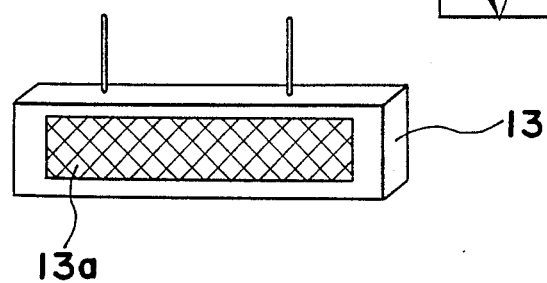
FIG. 8 is an enlarged view of a photodiode employed in the prior art photodetectors of FIGS. 3 and 5 (already referred to)
Figure 10:
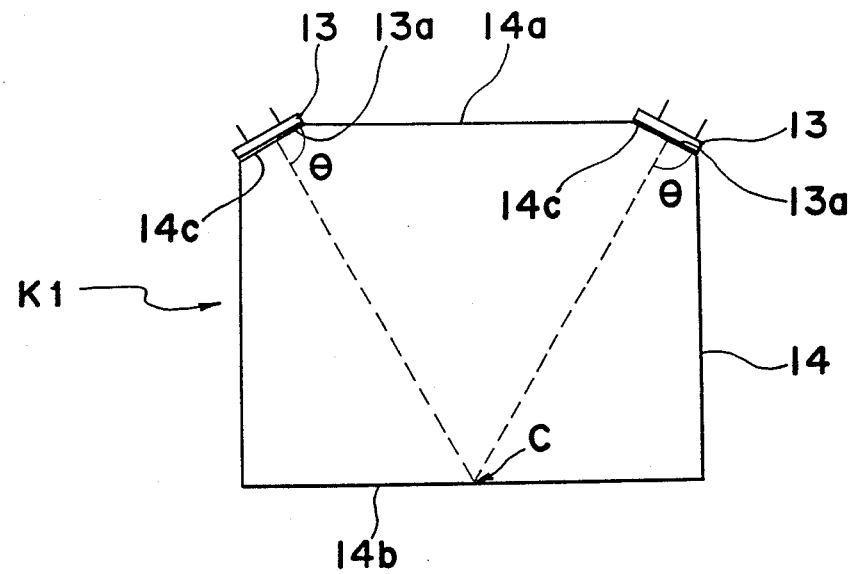
FIG. 10 is a top plan view of a photodetector according to a first embodiment of the present invention.

Referring now to the drawings, there is shown in FIG. 10, a photodetector K1 according to a first embodiment of the present invention. The photodetector K1 includes a planar light collector plate 14 made of material identical with that of the known light collector plate referred to above. The light collector plate 14 of rectangular shape is different, in planar shape and positions for disposing photodiodes, from the known rectangular light collector plate having the photodiodes attached to one side thereof. Namely, opposite corners of an upper side 14a (corresponding to an upper side portion of a phosphor screen) of the rectangular light collector plate 14 are cut off from the light collector plate 14 so as to form a pair of light emitting end surfaces 14c. A pair of photodiodes 13 are, respectively, provided at the light emitting end surfaces 14c such that a light receiving surface 13a of each of the photodiodes 13 confronts each of the light emitting end surfaces 14c. Meanwhile, it is most desirable that the light receiving surfaces 13a of the photodiodes 13 are so formed as to extend perpendicularly to, i.e. at an angle $\theta$ of 90° with, imaginary lines (broken lines) drawn from a center C of a lower side 14b (corresponding to a lower side portion of the phosphor screen) of the light collector plate 14.

Figure 11A:
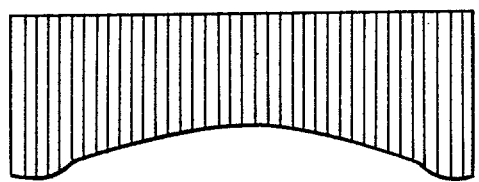
FIGS. 11a, 11b and 11c are views indicative of distributions of signal strength obtained in the photodetector of FIG. 10.
Figure 11B:
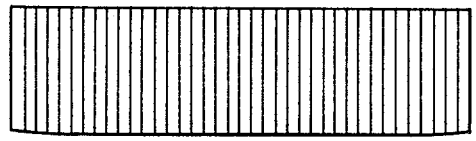
Figure 11C:
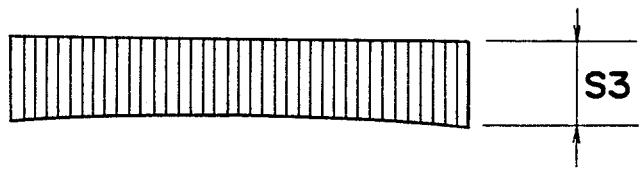

FIGS. 11a, 11b and 11c show distributions of signal strength obtained by horizontal scanning lines (scanning electron beams) at the upper side portion, a central portion and the lower side portion of the phosphor screen in the photodetector K1 of the above described arrangement, respectively. As is seen from FIGS. 11a, 11b and 11c, the signal strength of the photodetector K1 assumes a minimum value S3 at the lower side 14b of the light collector plate 14. However, even the minimum signal strength S3 of the photodetector K1 is more than twice the minimum signal strength S1 and the minimum signal strength S2 of the known photodetectors referred to earlier. Thus, it is apparent that index signals of sufficient strength can be obtained at any position of the light collector plate 14 in the photodetector K1.

Figure 12:
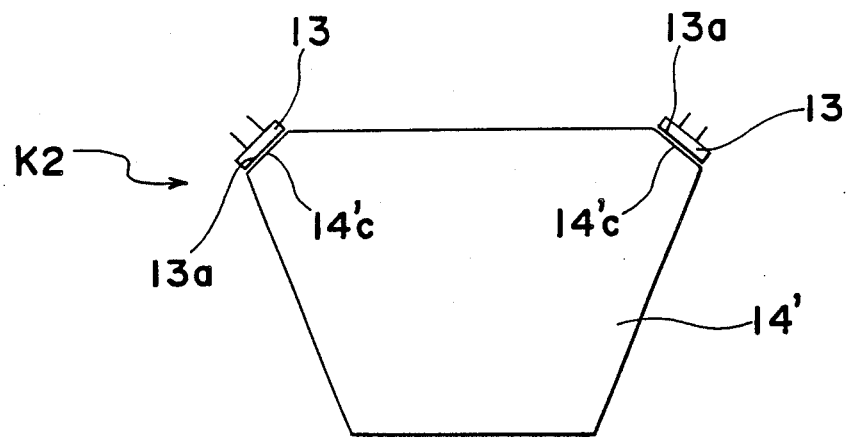
FIGS. 12 and 13 are views similar to FIG. 10, particularly showing second and third embodiments of the present invention, respectively.
Figure 13:
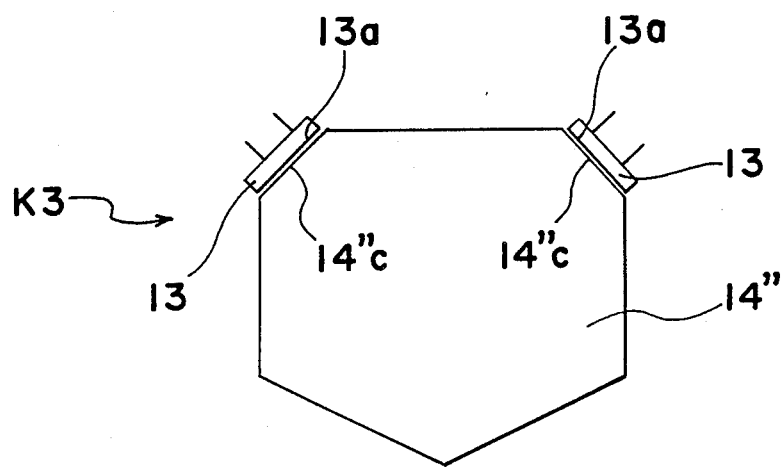

Meanwhile, the light collector plate 14 is not restricted, in shape, to rectangular shape as shown in FIG. 10 but can also be formed as shown in FIGS. 12 and 13 showing photodetectors K2 and K3 according to second and third embodiments of the present invention, respectively. In the photodetector K2 of FIG. 12, a pair of the photodiodes 13 are, respectively, disposed at a pair of light emitting end surfaces 14'c formed at opposite end portions of one side of a light collector plate 14' of trapezoidal shape such that each of the light receiving surfaces 13a of the photodiodes 13 confronts each of the light emitting end surfaces 14'. Meanwhile, in the photodetector K3 of FIG. 13, a pair of the photodiodes 13 are, respectively, disposed at a pair of light emitting end surfaces 14"c formed at opposite end portions of one side of a light collector plate 14" of pentagonal shape such that each of the light receiving surfaces 13a of the photodiodes 13 confronts each of the light emitting end surfaces 14". Furthermore, it can also be so arranged that the light collector plate 14 is formed into an arbitrary polygonal shape.

As is clear from the foregoing description, in the photodetector of simple construction of the present invention, light signals of sufficient strength can be obtained at any point of the light collector plate. Accordingly, if the photodetector of the present invention is applied to a beam-indexing type color cathode-ray tube, index signals of sufficient strength can be obtained by using a small amount of beam current and thus, it becomes possible to improve contrast of an image at the time of reproduction of a black level.

Although he present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a photodetector including a planar light guide of a quadrilateral shape in which organic phosphor is dispersed in a transparent shape in which organic phosphor is dispersed in a transparent support material, and a pair of photoelectric conversion elements such that light having a wavelength range for exciting said organic phosphor is introduced into said light guide and light generated from said organic phosphor upon excitation of said organic phosphor is guided to said photoelectric conversion elements, with said photoelectric conversion elements being sensitive to a wavelength of the light generated from said organic phosphor, the improvement comprising:

said light guide being formed, at opposite end portions of one side thereof, with a pair of light emitting end surfaces, wherein said light emitting end surfaces are formed by obliquely cutting off the opposite end portions of the one side of said light guide;

said photoelectric conversion elements being, respectively, provided at said light emitting end surfaces such that a light receiving surface of each of said photoelectric conversion elements confronts each of said light emitting end surfaces, and wherein said light emitting end surfaces are formed to have a geometric relationship with a lower side of said light guide, opposite said one side, such that a line extending from the center of the lower side of the light guide to each photoelectric conversion element is generally perpendicular to and substantially bisects each light receiving surface of each photoelectric conversion element, in order to raise a detection level of an index beam in the vicinity of the center of the lower side of the light guide.

2. A photodetector as claimed in claim 1, wherein said light guide is rectangular.

3. A photodetector as claimed in claim 1, wherein said light guide is trapezoidal.

* * * * *